G. TERRILL.
Carpet-Stretcher and Tack-Driver.

No. 226,634. Patented April 20, 1880.

Witnesses:
Floyd Norris
D. P. Cowl

George Terrill
Inventor
by Johnson & Johnson
Attys

UNITED STATES PATENT OFFICE.

GEORGE TERRILL, OF POUGHKEEPSIE, NEW YORK.

CARPET-STRETCHER AND TACK-DRIVER.

SPECIFICATION forming part of Letters Patent No. 226,634, dated April 20, 1880.

Application filed February 13, 1880.

*To all whom it may concern:*

Be it known that I, GEORGE TERRILL, of Poughkeepsie, in the county of Dutchess and State of New York, have invented certain new and useful Improvements in Carpet-Stretchers and Tack-Drivers, of which the following is a specification.

My invention relates to improvements in carpet-stretchers and tack-drivers in which the tack is driven by a pivoted or vibrating hammer operating to drive the tack by a swinging movement, in connection with a tack-chute and an open tack-cup holder formed upon pivoted jaws, which are opened by the descent of the hammer in driving the tack and closed by a spring to hold the tack in position to be driven. I do not broadly claim such a device, but only my improvements, by which I provide for delivering the tack with certainty into the holding-cup from the tack-chute, and to provide roller-bearings, by which the handstaff is supported in stretching the carpet, and by which said stretching device is maintained in flat position in driving the tack, as hereinafter described and claimed.

Figure 1:
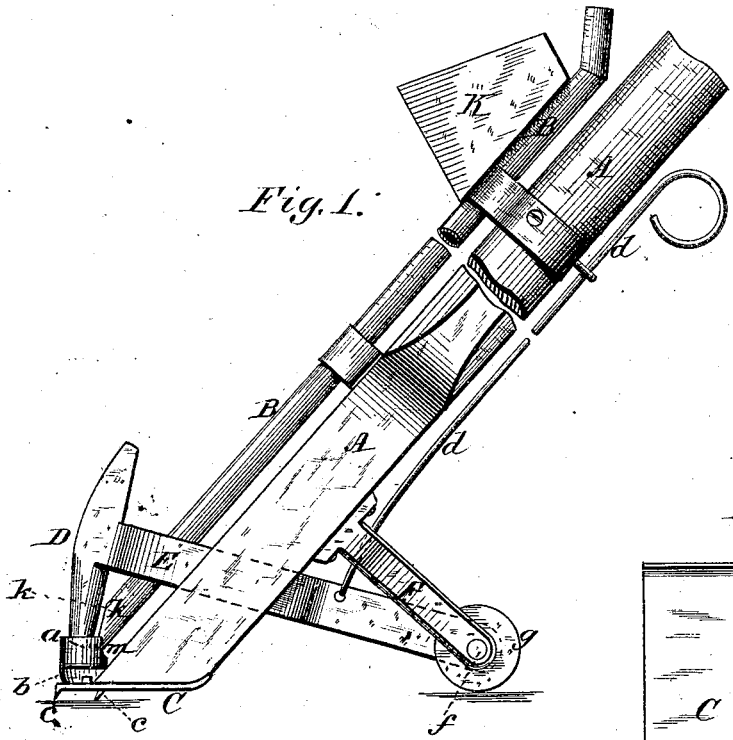
Figure 2:
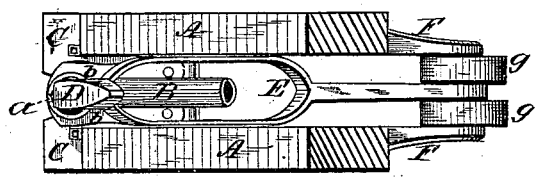
Figure 3:
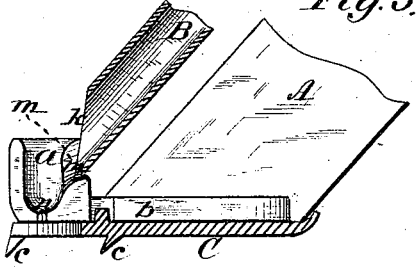

In the accompanying drawings, Figure 1 represents a side elevation of a carpet-stretcher and tack-driver embracing my improvements; Fig. 2, a top view with the hand-staff broken; Fig. 3, a sectional view, showing the cut-out rim-sections of the tack-holding cup, whereby said cup-sections are adapted to receive and to close upon the beveled chute termination, so as to cause the tack to be lodged with certainty in the cup-opening; and Fig. 4, a detail of the pivoted jaws, showing the cut-out portion of each section of the cup-rim.

The wooden hand-staff A is about six feet long, and the tack-chute B is secured to the upper side of the staff about two-thirds its length, and terminates within the tack-holding cup $a$, formed upon jaws $b$ $b$, pivoted to a stretching-plate, C, secured to the under beveled ends of the forked staff.

Figure 4:
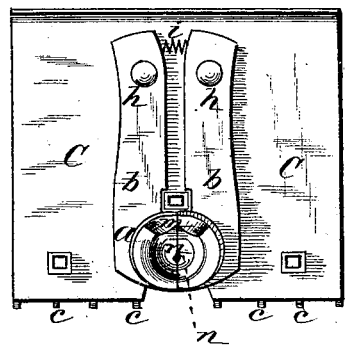

It is important that the junction of the chute with the tack-holding cup-sections should be such as to deliver the tack with certainty into the bottom opening, $n$, of the cup, and for this purpose the rim of each section of the cup is cut out at the rear side at $m$, so as to allow said cup-sections to close upon and embrace the beveled end $k$ of the tack-chute, as shown in Figs. 3 and 4, and thus avoid the liability of the tack jumping out of the cup as it emerges from the staff-chute. This chute is provided at its upper end with a receptacle, K, for the tacks, so that the operator has only to take out a tack and put it in the mouth of the chute, which is bent or curved upward for this purpose.

The hammer D is carried by a slotted handle, E, which passes through the forked end of the staff, as shown in Fig. 2, and through which slotted handle the tack-chute passes.

The hammer-handle is pivoted to brackets F on the under side of the staff, and is operated by a rod, $d$, passing through eyes on the under side of the staff, within reach of the operator.

The pivot $f$ of the hammer-handle is provided with rollers $g$ $g$, arranged so as to embrace the end of the handle, and thereby form side bearings to give the hammer a steady and true movement. These rollers are important in forming a rolling bearing for the staff in operating it upon the carpet, and holding the stretcher-plate C in a flat position thereon. For this purpose the rollers form a rest for the staff in driving the tack, the pressure upon the staff being borne alike by the rollers and stretching-plate, so that the teeth $c$ will hold the carpet secure while the tack is being driven by the hammer.

While the rollers hold the plate C in a true plane and the staff always at the proper inclination, they also serve, by forming a double bearing on each side of the hammer-handle, to hold the staff from wabbling and twisting upon the teeth while operating the hammer. They also serve to hold the staff from tilting sidewise while the operator is holding the carpet ready to be tacked.

These are important advantages in connection with a vibrating tack-driving hammer and a carpet-stretching staff operated in an inclined position both in stretching the carpet and driving the tack.

The jaws of the cup-sections are pivoted at $h$ $h$ upon the stretching-plate, and their cup ends are kept closed by a spring, $i$, placed between the rear ends of said jaws, while the cup-sections are opened by the impact of the hammer to drive the tack, the hammer being raised to allow the tack to enter the cup, which is then driven by a few blows of the hammer.

The cup-sections *a a* are cast so as to leave a rear opening, *m*, above their base, and this open back is closed by the tack-conduit, so as to form one side of the cup when closed upon the tack.

I claim—

1. In a carpet stretcher and tacker, the open tack-holding cup-sections *a*, having the open back *m*, in combination with the tack-chute, upon the end of which the cup-sections close, as shown, and for the purpose described.

2. In a carpet stretcher and tacker, the bearing-rollers *g g*, in combination with vibrating hammer, the stretching-plates, and the hand-staff, said rollers being arranged upon the pivot of the hammer-handle and on each side thereof, and on the under side of the staff, as shown, and for the purposes described.

In testimony whereof I have hereunto set my hand.

GEORGE TERRILL.

Witnesses:
A. E. H. JOHNSON,
J. W. HAMILTON JOHNSON.